(No Model.)
F. WIARD.
WEEDER.
No. 562,106. Patented June 16, 1896.
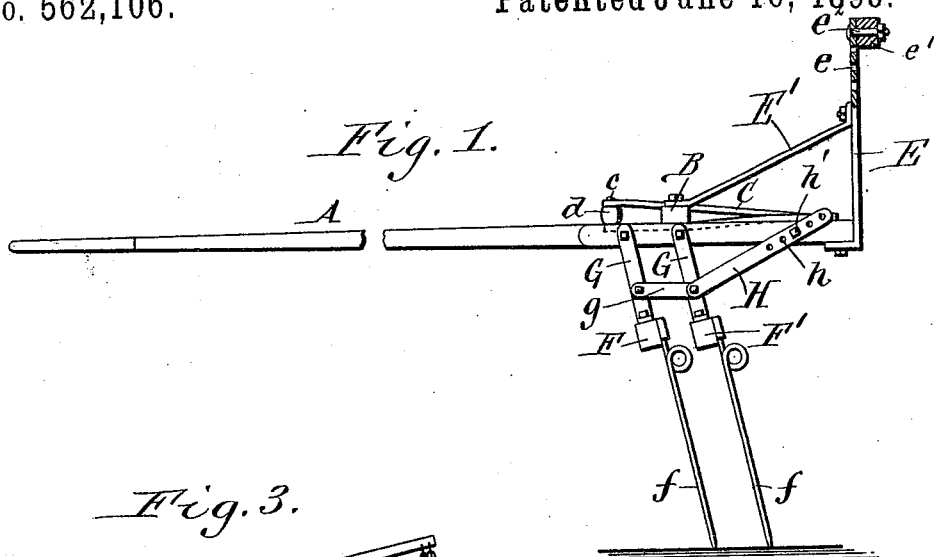
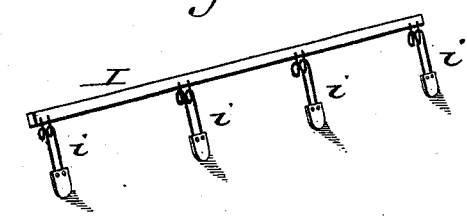
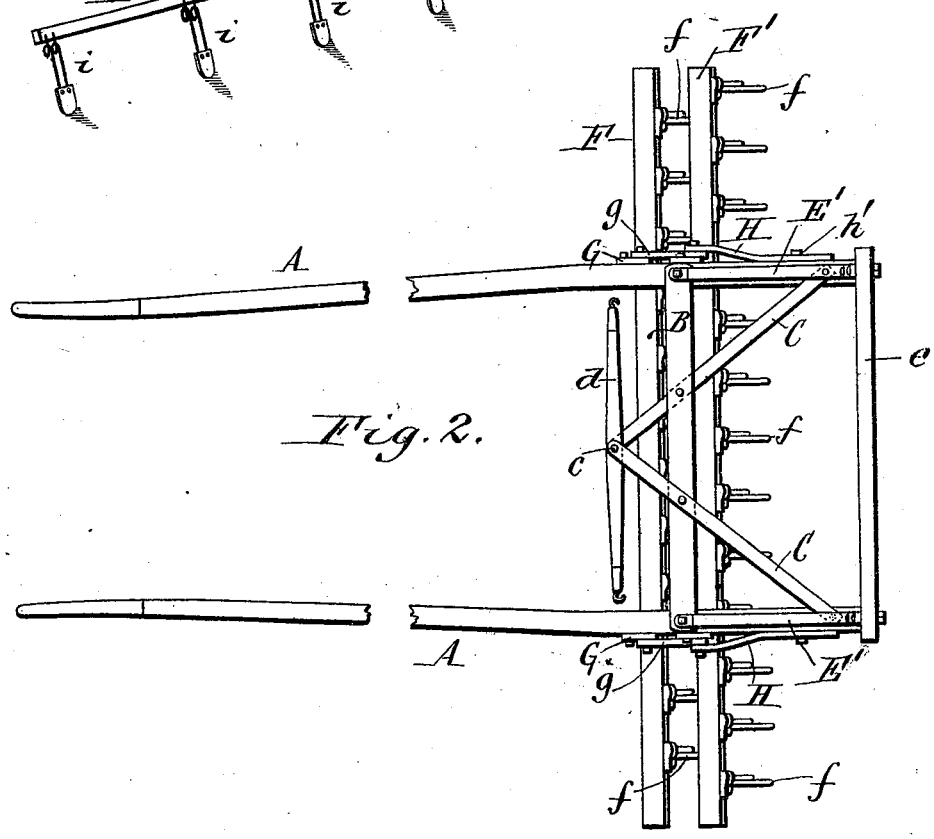
Witnesses:
Chas. F. Burkhardt
Theo. L. Popp
Frederick Wiard  Inventor.
By Wilhelm Bonner
Attorneys.

UNITED STATES PATENT OFFICE.

FREDERICK WIARD, OF BATAVIA, NEW YORK, ASSIGNOR TO THE WIARD PLOW COMPANY, OF SAME PLACE.

WEEDER.

SPECIFICATION forming part of Letters Patent No. 562,106, dated June 16, 1896.

Application filed March 8, 1894. Serial No. 502,808. (No model.)

*To all whom it may concern:*

Be it known that I, FREDERICK WIARD, a citizen of the United States, residing at Batavia, in the county of Genesee and State of New York, have invented a new and useful Improvement in Weeders, of which the following is a specification.

This invention relates to a toothed implement whereby the ground is loosened and the weeds are pulled up to promote the growth of the grain.

My invention has for its objects to improve the construction of the draft-frame, to render the weeder-teeth adjustable for different kinds of soil, and to provide means whereby the weeder can also be used as a marker when it is desired to plant crops in rows.

In the accompanying drawings, Figure 1 is a side elevation of my improved weeder. Fig. 2 is a top plan view thereof. Fig. 3 is a perspective view of the interchangeable head carrying the markers.

Like letters of reference refer to like parts in the several figures.

A represents the thills, which are connected near their rear ends by a cross-bar B.

C represents two forwardly-converging braces, which are secured with their rear ends to the rear ends of the thills. The front ends of the braces are arranged in front of the cross-bar B, and are connected by a vertical bolt $c$, upon which the whiffletree $d$ is pivoted between the braces. One of the braces is secured to the top of the cross-bar B and the other to the under side of the same.

E represents upright arms secured with their lower ends to the rear ends of the thills and each provided at its upper end with vertical rows of openings $e$.

$e'$ represents a transverse handle-bar, which is secured to the upright arms by bolts $e^2$, passing through a pair of the openings in said arms. By shifting the bolts $e^2$ in the openings of each arm the handle-bar can be raised or lowered to suit the height of the operator.

E' represents braces extending from the upper portions of the arms to the cross-bar. This draft-frame is very simple, light, and strong and can be produced at small cost.

F F' represent two heads or cross-bars, which are arranged transversely underneath the thills, one behind the other, and to which the teeth are attached. Each of these heads is provided with a row of depending spring-teeth $f$, the teeth of one head being arranged opposite the spaces between the teeth of the other head.

G represents hangers secured with their lower ends to the tooth-heads and attached with their upper ends to the thills by transverse pivots, so that the head and teeth can be swung backward and forward for changing their angle with reference to the ground. The lower portions of the hangers on opposite sides of the machine are pivotally connected by longitudinal links $g$, the distance between the pivots of each link being preferably the same as the distance between the pivoted upper ends of the hangers, so that the tooth-heads remain parallel with each other in their various adjusted positions.

H represents adjusting-bars whereby the angle of the teeth is adjusted. Each of these bars is pivoted with its front end to the lower portion of one of the rear hangers, while its rear end is provided with a longitudinal row of openings $h$, and secured to the adjacent thill by a bolt $h'$, passing through one of said openings. By changing the bolt $h'$ from one hole to another in the adjusting-bar, the teeth can be inclined more or less.

When the ground is comparatively hard, the teeth are preferably arranged vertically, or nearly so, in which position they are most effective; but when the ground is soft the teeth are adjusted so as to incline rearwardly, which reduces their tendency to dig into the ground and causes them to have more of a sliding action.

Before the planted grain has reached the surface of the ground all of the teeth are preferably used on the tooth-heads; but when the crops have grown to some size the teeth which strike the rows of plants are removed and only those which stand between the rows are used, allowing continued weeding and pulverizing without interfering with the plants.

When it is desired to use the machine for marking rows for planting crops in rows, the tooth-heads are removed and a marker-head I, having broad marking teeth or blades $i$, as shown in Fig. 3, is substituted for one of the tooth-heads.

I claim as my invention—

1. The combination with the thills, of a cross-bar connecting the thills in front of their rear ends, forwardly-converging braces connecting the rear ends of the thills with said cross-bar, upright arms secured to the rear ends of the thills, a handle-bar connecting the upper ends of the arms, and inclined braces connecting the upper portions of the arms with the thills, substantially as set forth.

2. The combination with the thills, and the cross-bar connecting the same, of upright arms secured to the rear ends of the thills and each provided with a vertical row of openings and a transverse handle-bar adjustably secured to the upright arms by bolts passing through a pair of the openings in said arms, substantially as set forth.

Witness my hand this 5th day of March, 1894.

FREDERICK WIARD.

Witnesses:
JOHN W. PRATT,
J. J. WASHBURN.